(12) United States Patent
Jung

(10) Patent No.: US 7,428,343 B2
(45) Date of Patent: Sep. 23, 2008

(54) APPARATUS AND METHOD OF MEASURING NOISE IN A VIDEO SIGNAL

(75) Inventor: Jae-han Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 718 days.

(21) Appl. No.: 10/986,315

(22) Filed: Nov. 12, 2004

(65) Prior Publication Data

US 2005/0110907 A1 May 26, 2005

(30) Foreign Application Priority Data

Nov. 21, 2003 (KR) ...................... 10-2003-0082924

(51) Int. Cl.
*G06K 9/40* (2006.01)
*G06K 9/46* (2006.01)

(52) U.S. Cl. ...................................... 382/254; 382/236

(58) Field of Classification Search ................. 382/254, 382/260–275, 236; 348/607–624, 625, 180, 348/701, 192–193; 375/240.12, 240.18, 375/240.16, 240.29
See application file for complete search history.

(56) References Cited

U.S. PATENT DOCUMENTS 6,169,583 B1 * 1/2001 Merkl et al. ................. 348/607
6,285,710 B1 9/2001 Hurst
6,359,658 B1 3/2002 He

FOREIGN PATENT DOCUMENTS

JP 10-056656 2/1998
KR 2001-038014 A 5/2001

* cited by examiner

*Primary Examiner*—Sherali Ishrat
(74) *Attorney, Agent, or Firm*—Stanzione & Kim, LLP

(57) ABSTRACT

An apparatus and method of measuring noise in video signals includes a high-frequency component determination part that detects a high-frequency component value of a first image to measure noise in a blockwise unit, a spatial filter that filters the first image in the blockwise unit, by applying different filtering methods according to the high frequency component value, and outputting the filtered image as a second image, a motion compensation error determination part that determines a presence of a motion compensation error by comparing a first difference between corresponding pixel values of the first image and the second image with a second difference between corresponding pixel values of the first image and a third image which is motion-compensated image derived from the first image, and a noise calculator that measures noise with reference to the second difference between the corresponding pixel values of the first image and the third image for pixels determined by the motion compensation error determination part to have no motion compensation error.

28 Claims, 4 Drawing Sheets

APPARATUS AND METHOD OF MEASURING NOISE IN A VIDEO SIGNAL

CROSS-REFERENCE TO RELATED APPLICATIONS

This application claims the benefit of Korean Patent Application No. 2003-82924, filed on Nov. 21, 2003, in the Korean Intellectual Property Office, the disclosure of which is incorporated herein in its entirety by reference.

BACKGROUND OF THE INVENTION

1. Field of the Invention

The present general inventive concept relates to an apparatus and method of measuring noise in video signals, and more particularly, to an apparatus and method of accurately measuring noise in video signals, regardless of the characteristics of the video signals.

2. Description of the Related Art

Noise in video signals typically causes a reduction in the quality of images in a video signal. In particular, the noise may degrade the image and also cause the images to deteriorate when encoding and decoding the video signal. To reduce the noise in the video signal, enhance image quality, and increase efficiency of encoding and decoding video signals, various technologies have been developed. In order to reduce the noise in the video signals, a noise measuring apparatus has to be provided to accurately measure the amount of noise. The amount of noise measured by the noise measuring apparatus is generally expressed as a variance or a standard deviation, which is equivalent to a square root of the variance.

FIG. 1 is a block diagram showing a conventional apparatus for measuring noise in video signals. As shown in FIG. 1, the noise measuring apparatus comprises an SAD calculator 1, an SAD comparator 3, an SAD counter 5, a comparator 7, and an incremental and decremental counter 9.

The SAD calculator 1 calculates a sum of absolute difference (SAD), that is, the sum of absolute difference between neighboring pixels in an input image. The SAD calculator 1 calculates the absolute difference between a pixel of a current input image and a pixel of a one-clock-delayed input image, and calculates the SAD value which is the sum total of the absolute differences being one-clock-delayed, two-clock-delayed, and three-clock-delayed. The SAD comparator 3 determines whether the SAD calculated by the SAD calculator 1 lies within a predetermined range. If the calculated SAD lies within the predetermined range (i.e., the SAD is between a lower limit A and an upper limit B), the SAD comparator 3 outputs a true value. If the calculated SAD lies outside the predetermined range, the SAD comparator 3 outputs a false value. If the output of the SAD comparator 3 is a true value, the SAD counter 5 is increased by a certain count. The SAD counter 5 is reset once per picture cycle (field or frame period). Accordingly, the SAD counter 5 counts the SADs within the predetermined range in every picture.

The comparator 7 compares the count of the SAD counter 5 with a predetermined value (NE), and if the count of the SAD counter 5 falls below the predetermined value in every picture, the count of the incremental and decremental counter 9 is increased. If the count of the SAD counter 5 exceeds the predetermined value, the count of the incremental and decremental counter 9 is decreased. The count of the incremental and decremental counter 9, which is increased and decreased according to the result of the comparator 7, is a noise measurement. The noise measurement is fed back to the SAD comparator 3 as a reference to determine whether the SAD is within a predetermined range. An example of the conventional apparatus for noise measurement as described above is disclosed in U.S. Pat. No. 5,657,401.

However, since the noise measurements calculated by the conventional noise measuring apparatus depend on the distribution of the SADs of the video signals, the noise measurements may differ depending on the characteristics of the video signals. The noise measurements, in some cases, may even differ if the amounts of noise in the video signals are the same. For example, this may occur when comparing a noise measurement of a video signal containing complicated and detailed areas with a noise measurement of a video signal containing simple and plane areas. Accordingly, there is a need for an apparatus that is capable of calculating accurate noise measurements regardless of the characteristics of the video signals.

SUMMARY OF THE INVENTION

The present general inventive concept provides an apparatus and method of measuring noise in video signals, which is capable of accurately measuring the amount of noise introduced in video signals regardless of the characteristics of an image reproduced by the video signals.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept are achieved by providing an apparatus that measures a noise in video signals. The apparatus comprises a high-frequency component determination part that detects a high-frequency component value of a first image to measure noise in a blockwise unit, the high-frequency component value indicating an amount of the high-frequency component in the first image, a spatial filter that filters the first image in the blockwise unit, by applying different filtering methods according to the high frequency component value, and outputting the filtered image as a second image, a motion compensation error determination part that determines a presence of a motion compensation error by comparing a first difference between corresponding pixel values of the first image and the second image with a second difference between corresponding pixel values of the first image and a third image, which is a motion-compensated image derived from the first image, and a noise calculator that measures noise with reference to the second difference between the corresponding pixel values of the first image and the third image of pixels determined by the motion compensation error determination part to have no motion compensation error.

A high-frequency component value may be determined from absolute differences which are calculated by applying different directional characteristics to pixels surrounding an origin pixel, which acts as a reference pixel among blockwise pixels. A spatial filter may divide the high-frequency component value into a flat area, a middle area, and a high-frequency area according to the amount of the high-frequency component value in the first image, and perform different filterings for the respective areas.

When the pixels of the first and the third images corresponding to the pixel of the second image have the same direction, the motion compensation error determination part determines the presence of the motion compensation error by the following equation:

$|\Delta_{NS}-\text{offset}| \triangleleft \Delta_{NM}| \triangleleft \Delta_{NS}|+\text{offset},$ wherein offset denotes a predetermined offset value, $\Delta_{NM}$ denotes a difference between corresponding pixel values of the first and the third image, and $\Delta_{NS}$ denotes a difference between corresponding pixel values of the first and the second image.

When the pixels of the first and the third images corresponding to the pixel of the second image have different directions, the motion compensation error determination part determines the presence of the motion compensation error by the following equation:

$|\Delta_{NS}|-\text{offset} \triangleleft \Delta_{NM}| \triangleleft \Delta_{NS}|,$ wherein offset denotes a predetermined offset value, $\Delta_{NM}$ denotes a difference between corresponding pixel values of the first and the third image, and $\Delta_{NS}$ denotes a difference between corresponding pixel values of the first and the second image. The offset varies according to the noise measurement.

The noise calculator measures the noise by the following equation:

$$\delta = \sqrt{\frac{\sum (F_{mc}(x, y) - F_{noise}(x, y))}{N}},$$

wherein $\delta$ denotes the noise measurement, $F_{mc}$(x,y) denotes the pixel value of the third image, $F_{noise}$(x,y) denotes the pixel value of the first image, and N denotes the number of pixels.

The foregoing and/or other aspects and advantages of the present general inventive concept are achieved by providing a method of measuring a noise in video signals, comprising detecting a high-frequency component value of a first image to measure noise in a blockwise unit, the high-frequency component value indicating an amount of the high-frequency component in the first image, filtering the first image in the blockwise unit, by applying different filtering methods according to the high-frequency component value, and outputting the filtered image as a second image, determining a presence of a motion compensation error by comparing a first difference between corresponding pixel values of the first image and the second image with a second difference between corresponding pixel values of the first image and a third image, which is a motion-compensated image derived from the first image, and measuring the noise with reference to the second difference between the pixel values of the first image and the third image of pixels determined to have no motion compensation error by the motion compensation error determination part. The high-frequency component value may be determined from absolute differences which are calculated by applying different directional characteristics to pixels surrounding an origin pixel, which acts as a reference pixel among blockwise pixels. The operation of filtering divides the high-frequency component value into a flat area, a middle area, and a high-frequency area according to the amount of the high-frequency component value in the first image, and perform different filterings for the respective areas. When the pixels of the first and the third images corresponding to the pixel of the second image have the same direction, the motion compensation error determination operation determines the presence of the motion compensation error by the following equation:

$|\Delta_{NS}-\text{offset}| \triangleleft \Delta_{NM}| \triangleleft \Delta_{NS}|+\text{offset},$ wherein offset denotes a predetermined offset value, $\Delta_{NM}$ denotes a difference between corresponding pixel values of the first and the third image, and $\Delta_{NS}$ denotes a difference between corresponding pixel values of the first and the second image.

When the pixels of the first and the third images corresponding to the pixel of the second image have different directions, the motion compensation error determination operation determines the presence of the motion compensation error by the following equation:

$|\Delta_{NS}|-\text{offset} \triangleleft \Delta_{NM}| \triangleleft \Delta_{NS}|,$ wherein offset denotes a predetermined offset value, $\Delta_{NM}$ denotes a difference between corresponding pixel values of the first and the third image, and $\Delta_{NS}$ denotes a difference between corresponding pixel values of the first and the second image. The offset varies according to the noise measurement.

The noise is measured by the following equation:

$$\delta = \sqrt{\frac{\sum (F_{mc}(x, y) - F_{noise}(x, y))}{N}},$$

wherein $\delta$ denotes the noise measurement, $F_{mc}$(x,y) denotes the pixel value of the third image, $F_{noise}$(x,y) denotes the pixel value of the first image, and N denotes the number of pixels.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
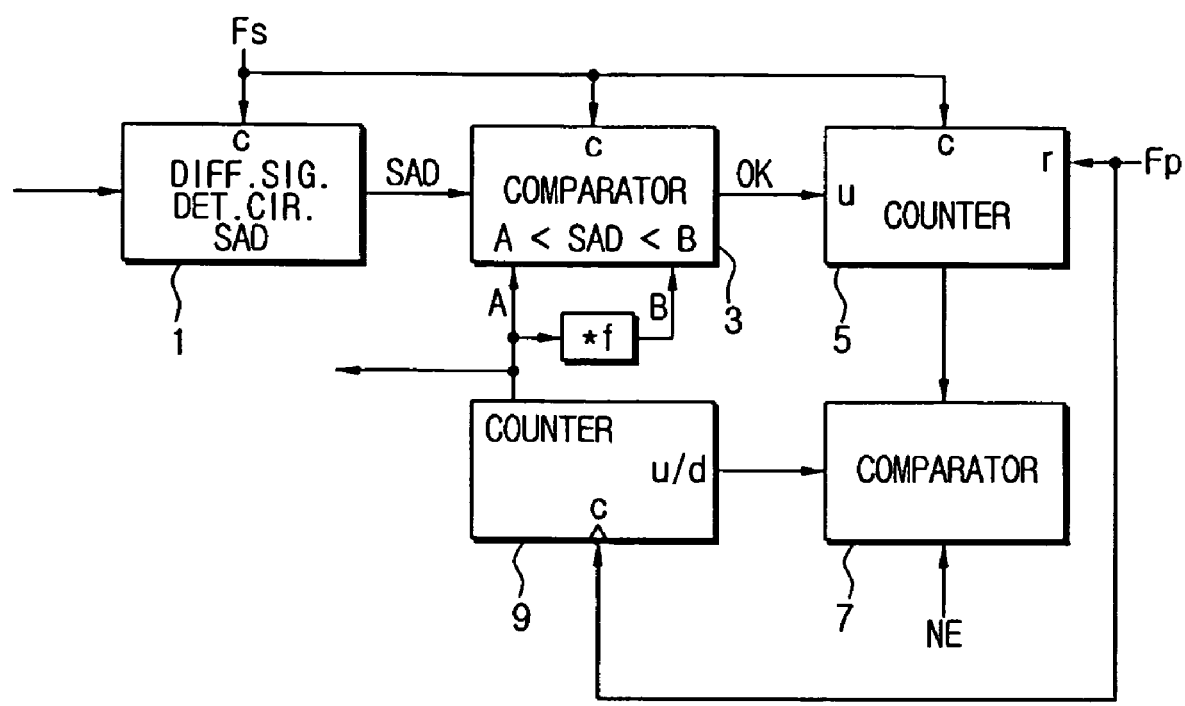
FIG. 1 is a block diagram showing a conventional apparatus that measures noise in video signals.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
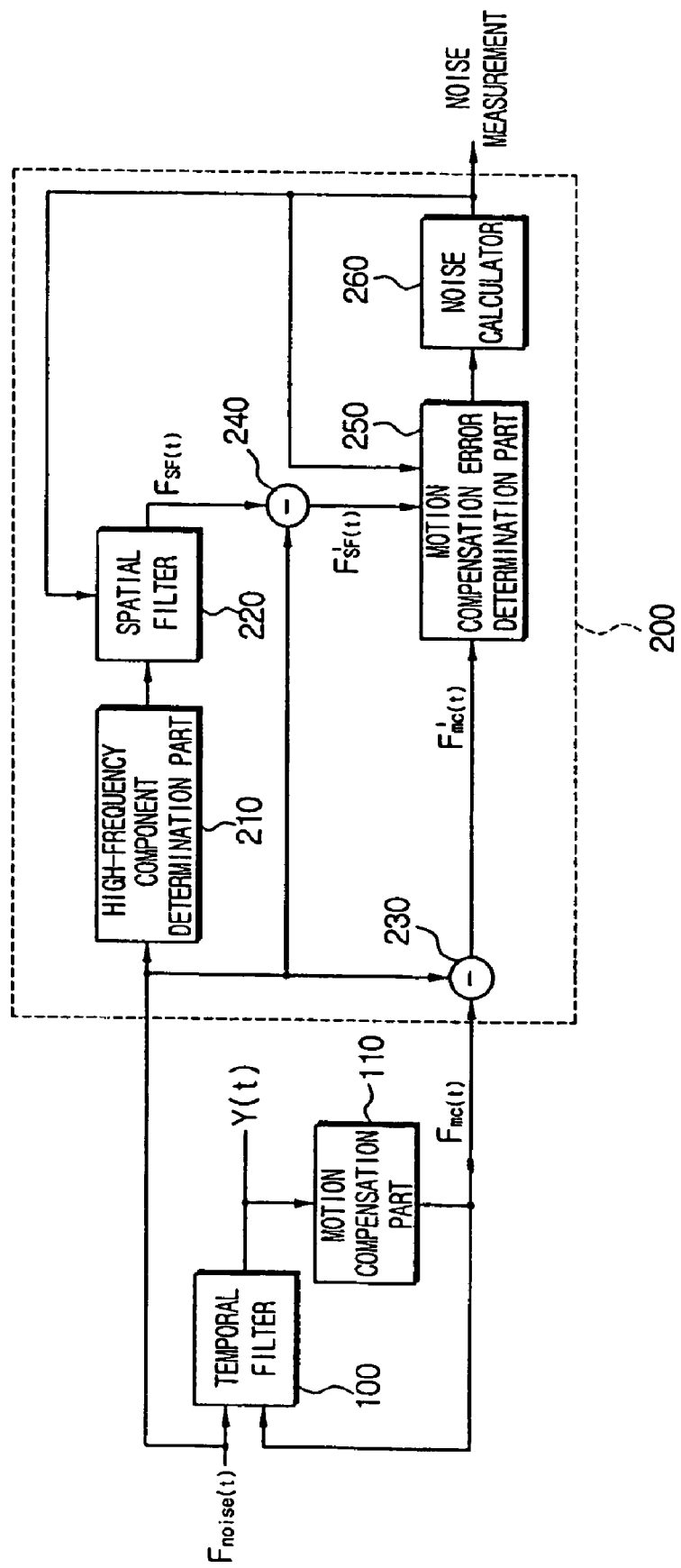
FIG. 2 is a block diagram showing an apparatus that measures noise in video signals according to an embodiment of the present general inventive concept.

FIG. 2 is a block diagram showing an apparatus that measures noise in video signals according to an embodiment of the present general inventive concept. Referring to FIG. 2, a noise measuring apparatus 200 comprises a high-frequency component determination part 210, a spatial filter 220, a first subtraction part 230 and a second subtraction part 240, a motion compensation error determination part 250, and a noise calculator 260. The noise measuring apparatus 200 receives a first image $F_{noise}$ (t) with a noise and an image $F_{mc}$ (t) which is a motion-compensated image derived from the first image $F_{noise}$ (t) through a temporal filter 100 and a motion compensation part 110.

With respect to the first image $F_{noise}$ (t), the high-frequency component determination part 210 uses a plurality of masks having a respective directional characteristic to detect a high-frequency component value at the position of an origin pixel equivalent to a reference pixel within the mask. The spatial filter 220 filters the first image $F_{noise}$ (t) according to the high-frequency component value detected by the high-frequency component determination part 210, and outputs the filtered image as a second image $F_{SF}$ (t). The motion compensation error determination part 250 determines whether there is a motion compensation error by referring to the second image $F_{SF}$ (t) which was filtered by the spatial filter 220. The noise calculator 260 measures a noise of the pixels identified as having no motion compensation error by the motion compensation error determination part 250. The first subtraction part 230 calculates a difference $F'_{mc}$ (t) between the motion-compensated third image $F_{mc}$ (t) and the first image $F_{noise}$ (t), and the second subtraction part 240 calculates a difference $F_{SF}$ (t) between the filtered second image $F_{SF}$ (t) and the first image $F_{noise}$ (t). The first and the second subtraction parts 230 and 240 feed the differences $F'_{mc}$ (t) and $F'_{SF}$ (t) to the motion compensation error determination part 250.

Figure 3:
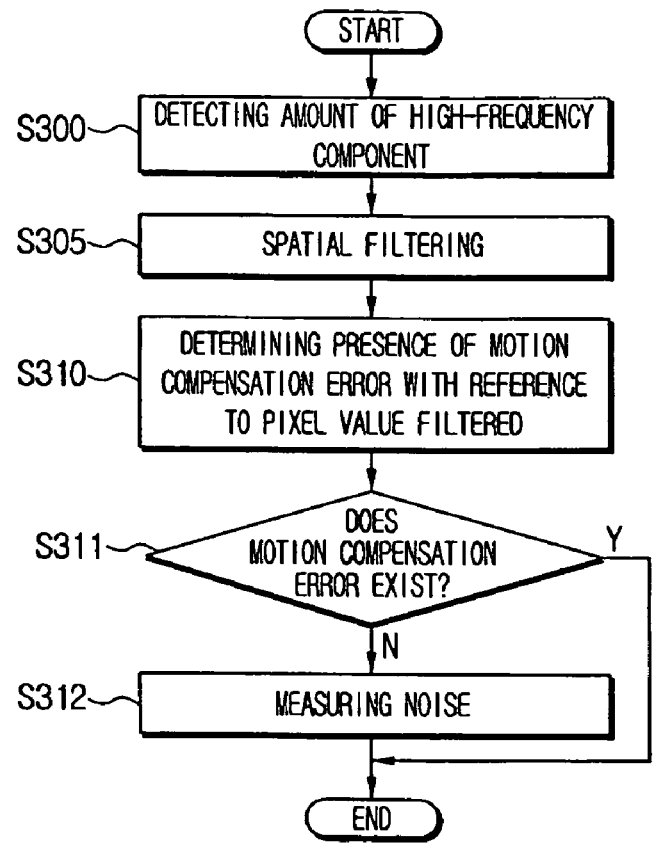
FIG. 3 is a flowchart showing a method of measuring noise in video signals according to another embodiment of the present general inventive concept.
Figure 4:
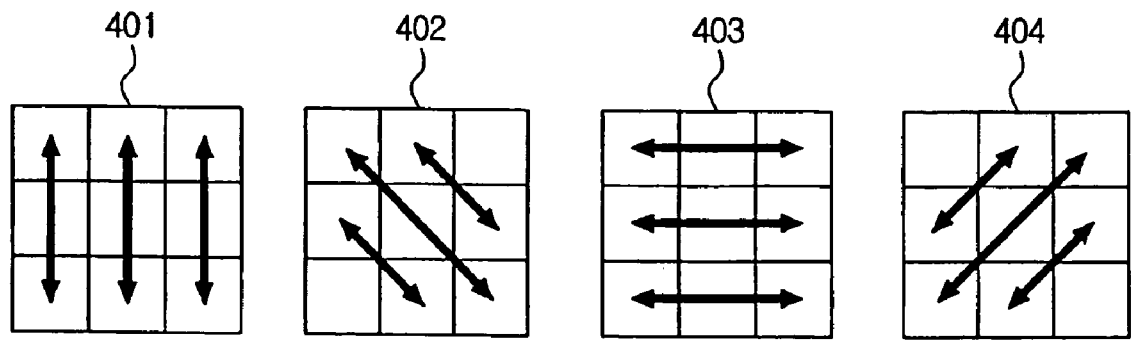
FIG. 4 is a view showing the operation of the high frequency component determination part of FIG. 2.

FIG. 3 is a flowchart showing a method performed by a noise measuring apparatus that measures noise of an image signal according to an embodiment of the present general inventive concept. When measuring noise of the first image $F_{noise}$ (t), the high frequency component determination part 210 detects an amount of a high-frequency component with respect to the first image $F_{noise}$ (t), to obtain a high frequency component value (S300). The amount of the high-frequency component is determined by using four masks 401, 402, 403, and 404, each having different directional characteristics as shown in FIG. 4. More specifically, absolute differences (ADs) are obtained from the pairs of dark pixels which are pointed by the arrows with respect to the origin pixel disposed in the center. In FIG. 4, three ADs are calculated for each mask 401, 402, 403, and 404. A median is derived from the ADs of each mask as a representative value. Of four representative values calculated from the respective masks 401, 402, 403, and 404, the greatest AD becomes the high frequency component value which will determine the amount of high-frequency component in the first image $F_{noise}$ (t).

Figure 5:
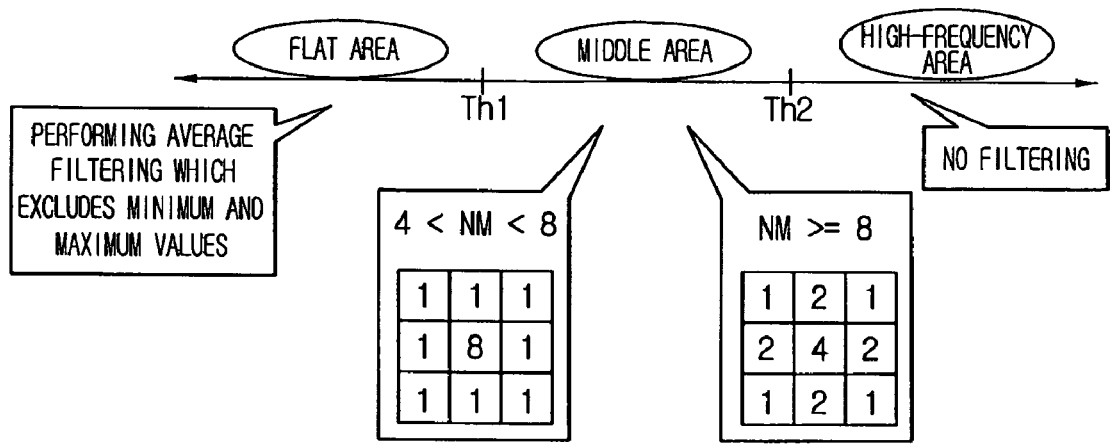
FIG. 5 is a view showing the operation of the spatial filter of FIG. 2.

The spatial filter 220 performs different spatial filtering according to the high-frequency component value detected by the high-frequency component determination part 210 (S305). That is, as shown in FIG. 5, the magnitude of the high-frequency component value is divided into a flat area, a middle area, and a high-frequency area according to a comparison with a first threshold value Th1 and a second threshold value Th2. The first and the second threshold values Th2 and Th2 may be varied according to feedback of the noise measurement.

If the high-frequency component value calculated by the high-frequency component determination part 210 is within the flat area, an average filtering excluding the maximum and minimum values is performed. This can be expressed by the following equation:

$$F(x, y)=F(x, y)-(F(x, y)-avg) \times wgt,  \quad [\text{Equation 1}]$$

wherein, avg denotes an average of pixel values of a mask, excluding maximum and minimum pixel values, wgt denotes a weight adaptively set according to the feedback of noise measurement, and F(x,y) denotes a pixel value of the first image $F_{noise}$ (t).

If the high-frequency component value calculated by the high-frequency component determination part 210 is within the middle area, a filtering is performed by using one of two filter masks illustrated in FIG. 5. Determining which filter mask to use, among the two filter masks as shown in FIG. 5, depends on the feedback of the noise measurement to the spatial filter 220. If the high-frequency component value calculated by the high-frequency component determination part 210 exceeds the second threshold Th2 and therefore lies within the high frequency area, filtering is not performed.

The image filtered by the spatial filter 220 through above processes becomes the second image $F_{SF}$ (t).

The motion compensation error determination part 250 determines a presence of the motion compensation error with reference to the pixel value filtered and output from the spatial filter 220 (S310). That is, the presence of the motion compensation error is determined based on the difference $F'_{mc}$ (t) between the first image $F_{noise}$ (t) and the motion-compensated third image $F_{mc}$ (t) and the difference $F'_{SF}$ (t) between the first image $F_{noise}$ (t) and the second image $F_{SF}$ (t).

Figure 6:
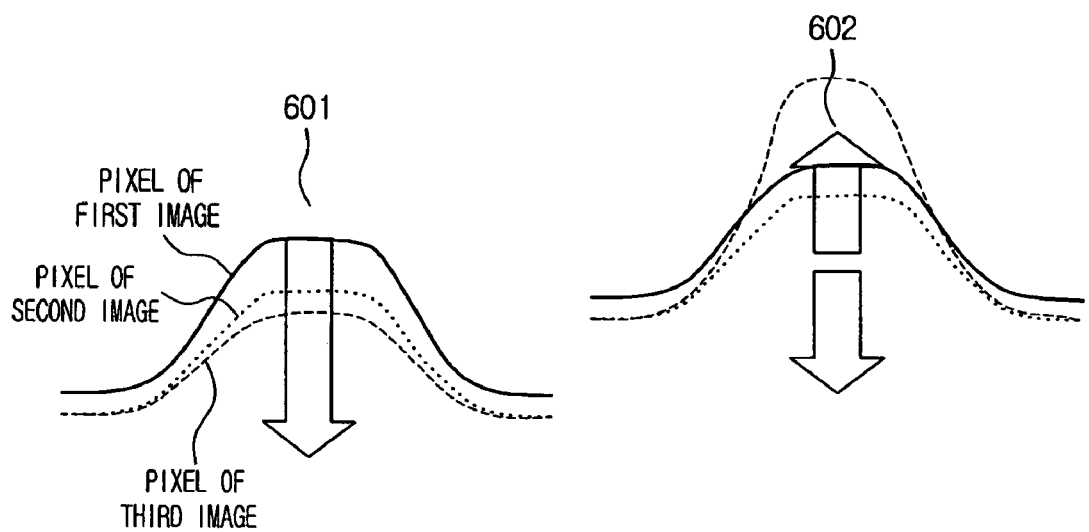
FIG. 6 is a view showing the operation of the motion compensation error determination part of FIG. 2.

If pixels of the first image $F_{noise}$ (t) and third image $F_{mc}$ (t) corresponding to the second image $F_{SF}$ (t) each have the same direction as shown in 601 of FIG. 6, the presence of the motion compensation error is determined by the following equation:

$$|\Delta_{NS} - offset| \triangleleft \Delta_{NM}| \triangleleft \Delta_{NS}| + offset,  \quad [\text{Equation 2}]$$

wherein, $\Delta_{NM}=F_{noise}(x, y)-F_{MC}(x, y)$, and $\Delta_{NS}=F_{noise}(x, y)-F_{SF}(x, y)$.

If a pixel satisfies the equation 2, it is determined that there is no motion compensation error in the pixel.

If pixels of the first image $F_{noise}$ (t) and the third image $F_{mc}$ (t) corresponding to the second image $F_{SF}$ (t) each have different directions as shown in 602 of FIG. 6, the presence of the motion compensation error is determined by the following equation:

$$|\Delta_{NS}| - offset \triangleleft \Delta_{NM}| \triangleleft \Delta_{NS}|  \quad [\text{Equation 3}]$$

If a pixel satisfies the equation 3, it is determined that there is no motion compensation error in the pixel. Additionally, the offset value of the equations 2 and 3 is set to "offset $=-F_{SF}$ (x,y)" when the noise measurement is relatively great, for example, greater than 8, so that the presence of the motion compensation error is determined adaptively according to the noise measurement.

If pixels are determined to have no motion compensation error by the motion compensation error determination part 250, the noise calculator 260 calculates the noise measurement by the following equation:

$$\delta = \sqrt{\frac{\sum (F_{mc}(x, y) - F_{noise}(x, y))}{N}},  \quad [\text{Equation 4}]$$

wherein, N specifies the number of pixels. The noise measurement calculated by the noise calculator 260 is fed back to the spatial filter 220 and the motion compensation error determination part 250.

Through the above-described processes, the amount of noise is accurately measured by using the current image, the current image after motion compensation, and the current image after filtering.

According to the present general inventive concept, the amount of noise is accurately measured by using the difference between the current image and the image reconstructed by the motion compensation method, regardless of frequency component distribution or the characteristics of the video signal. Additionally, the amount of noise measurement may be expressed by a number, which enables more effective removal of the noise. The amount of noise measurement may be utilized in improving the performances of a noise reducer or other image processing apparatus.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An apparatus to measure noise in video signals comprising:
    a high-frequency component determination part that detects a high-frequency component value of a first image to measure noise in a blockwise unit, the high-frequency component value indicating an amount of the high-frequency component in the first image;
    a spatial filter that filters the first image in the blockwise unit by applying different filtering methods according to the high frequency component value and outputs the filtered image as a second image;
    a motion compensation error determination part that determines a presence of a motion compensation error by comparing a first difference between corresponding pixel values of the first image and the second image with a second difference between corresponding pixel values of the first image and a third image which is motion-compensated from the first image; and
    a noise calculator that measures noise with reference to the second difference between the corresponding pixel values of the first image and the third image of pixels determined by the motion compensation error determination part to have no motion compensation error.

2. The apparatus as claimed in claim 1, wherein the high-frequency component value is determined from absolute differences calculated by applying different directional characteristics to pixels around an origin pixel which acts as a reference pixel among blockwise pixels.

3. The apparatus as claimed in claim 1, wherein the spatial filter divides the high-frequency component value into a flat area, a middle area, and a high-frequency area according to the amount of the high-frequency component value, and performs different filterings for the flat area, the middle area, and the high-frequency area.

4. The apparatus as claimed in claim 3, wherein if the high-frequency component value is within the flat area, the spatial filter performs an average filtering and excludes a maximum and a minimum value according to the following equation:

$$F(x,y)=F(x,y)-(F(x,y)-\text{avg})\times \text{wgt},$$

wherein, avg denotes an average of pixel values of a mask used by the spatial filter to exclude minimum and maximum values, wgt denotes a weight adaptively set according to a feedback of the noise measurement, and F(x,y) denotes a pixel value of the first image.

5. The apparatus as claimed in claim 3, wherein if the high-frequency component value is within the middle area, the spatial filter selects a filter mask according to a feedback of the noise measurement.

6. The apparatus as claimed in claim 3, wherein if the high-frequency component value is within the high-frequency area, the spatial filter does not perform filtering.

7. The apparatus as claimed in claim 1, wherein when the pixels of the first and the third images corresponding to the pixels of the second image have the same direction, the motion compensation error determination part determines the presence of the motion compensation error by the following equation:

$$|\Delta_{NS}-\text{offset}| \triangleleft |\Delta_{NM}| \triangleleft |\Delta_{NS}|+\text{offset},$$

wherein offset denotes a predetermined offset value, $\Delta_{NM}$ denotes a difference between corresponding pixel values of the first and the third image, and $\Delta_{NS}$ denotes a difference between corresponding pixel values of the first and the second image.

8. The apparatus as claimed in claim 1, wherein when the pixels of the first and the third images corresponding to the pixels of the second image have different directions, the motion compensation error determination part determines the presence of the motion compensation error by the following equation:

$$|\Delta_{NS}|-\text{offset} \triangleleft |\Delta_{NM}| \triangleleft |\Delta_{NS}|,$$

wherein offset denotes a predetermined offset value, $\Delta_{NM}$ denotes a difference between corresponding pixel values of the first and the third image, and $\Delta_{NS}$ denotes a difference between corresponding pixel values of the first and the second image.

9. The apparatus as claimed in claim 8, wherein the predetermined offset value varies according to the noise measurement.

10. The apparatus as claimed in claim 1, wherein the noise calculator measures the noise by the following equation:

$$\delta = \sqrt{\frac{\sum (F_{mc}(x,y) - F_{noise}(x,y))}{N}},$$

wherein $\delta$ denotes the noise measurement, $F_{mc}(x,y)$ denotes the pixel value of the third image, $F_{noise}(x,y)$ denotes the pixel value of the first image, and N denotes a number of pixels.

11. A method of measuring a noise in video signals, the method comprising:
    detecting a high-frequency component value of a first image to measure noise in a blockwise unit, the high-frequency component value indicating an amount of the high-frequency component in the first image;
    filtering the first image in the blockwise unit by applying different filtering methods according to the high-frequency component value and outputting the filtered image as a second image;
    determining a presence of a motion compensation error by comparing a first difference between corresponding pixel values of the first image and the second image with a second difference between corresponding pixel values of the first image and a third image, which is a motion-compensated image derived from the first image; and
    measuring noise with reference to the second difference between the pixel values of the first image and the third image for pixels determined to have no motion compensation error.

12. The method as claimed in claim 11, wherein the high-frequency component value is determined from absolute differences which are calculated by applying different directional characteristics to pixels around an origin pixel which acts as a reference pixel among blockwise pixels.

13. The method as claimed in claim 11, wherein the operation of filtering divides the high-frequency component value into a flat area, a middle area, and a high-frequency area according to the amount of the high-frequency component value, and performs different filterings for the flat area, the middle area, and the high-frequency area.

14. The method as claimed in claim 11, wherein when the pixels of the first and the third images corresponding to the pixels of the second image have the same direction, the motion compensation error determination operation determines the presence of the motion compensation error by the following equation:

$$|\Delta_{NS}-\text{offset}|\triangleleft\Delta_{NM}|\triangleleft\Delta_{NS}|+\text{offset},$$

wherein offset denotes a predetermined offset value, $\Delta_{NM}$ denotes a difference between corresponding pixel values of the first and the third image, and $\Delta_{NS}$ denotes a difference between corresponding pixel values of the first and the second image.

15. The method as claimed in claim 11, wherein when the pixels of the first and the third images corresponding to the pixels of the second image have different directions, the motion compensation error determination operation determines the presence of the motion compensation error by the following equation:

$$|\Delta_{NS}|-\text{offset}\triangleleft\Delta_{NM}|\triangleleft\Delta_{NS}|,$$

wherein offset denotes a predetermined offset value, $\Delta_{NM}$ denotes a difference between corresponding pixel values of the first and the third image, and $\Delta_{NS}$ denotes a difference between corresponding pixel values of the first and the second image.

16. The method as claimed in claim 15, wherein the predetermined offset value varies according to the noise measurement.

17. The method as claimed in claim 11, wherein the noise is measured by the following equation:

$$\delta = \sqrt{\frac{\sum (F_{mc}(x, y) - F_{noise}(x, y))}{N}},$$

wherein $\delta$ denotes the noise measurement, $F_{mc}$ (x,y) denotes the pixel value of the third image, $F_{noise}$ (x,y) denotes the pixel value of the first image, and N denotes a number of pixels.

18. A method of measuring noise in a video signal having one or more images, the method comprising:
  receiving a first image and a motion-compensated first image;
  providing a filtered image by filtering the first image according to an amount of high-frequency component in the first image;
  determining a first difference between the first image and the motion-compensated first image;
  determining a second difference between the first image and the filtered image;
  determining a presence of a motion compensation error according to the first difference and the second difference; and
  measuring noise in the first image of pixels that do not have motion compensation error.

19. The method of claim 18, wherein measuring noise in the first image of pixels that do not have motion compensation error further comprises:
  measuring noise in the first image by the following equation:

$$\delta = \sqrt{\frac{\sum (F_{mc}(x, y) - F_{noise}(x, y))}{N}},$$

wherein $\delta$ denotes the noise measurement, $F_{mc}$ (x,y) denotes a pixel value of the motion-compensated first image, $F_{noise}$ (x,y) denotes the pixel value of the first image, and N denotes a number of pixels.

20. The method of claim 18, wherein measuring noise in the first image of pixels that do not have motion compensation error further comprises:
  measuring noise with reference to the second difference between pixel values of the first image and the motion-compensated first image of pixels determined to have no motion compensation error.

21. The method of claim 18, wherein measuring noise in the first image of pixels that do not have motion compensation error further comprises:
  measuring noise for the first image by determining a square root value of an average of the first difference of pixels determined not to have motion compensation error.

22. The method according to claim 18, further comprising:
  after receiving the first image and the motion-compensated first image, detecting the amount of the high-frequency component in the first image by using a plurality of masks having different directional characteristics to obtain one or more absolute differences associated with the first image and determining the greatest absolute difference of the one or more absolute differences associated with the first image to represent the high-frequency component value.

23. The method according to claim 18, wherein providing a filtered image by filtering the first image according to an amount of high-frequency component further comprises:
  dividing the high-frequency component into one or more of a flat area, a middle area, and a high-frequency area;
  selecting a corresponding filter according to the divided high-frequency component; and
  applying the corresponding filter to the first image.

24. An apparatus to measure noise in a video signal having one or more images comprising:
  a filter that receives a first image and creates a filtered first image based on a high-frequency component value of the first image;
  a motion compensation error determination part that receives a difference between the filtered first image and the first image and a difference between a motion-compensated first image and the first image and determines pixels of the first image that do not have a motion compensation error based on a function of the difference between the filtered first image and the first image and the difference between a motion-compensated first image and the first image; and
  a noise calculator that measures noise in the first image with reference to the difference between the motion-compensated first image and the pixels of the first image that are determined not to have motion compensation error.

25. The apparatus as claimed in claim 24, wherein the high-frequency component value of the first image is determined from absolute differences calculated by applying different directional characteristics to pixels around an origin pixel, which acts as a reference pixel among blockwise pixels.

26. The apparatus as claimed in claim 24, wherein the filter divides the high-frequency component value into a flat area, a middle area, and a high-frequency area according to an amount of the high-frequency component value, and performs different filterings for the flat area, the middle area, and the high-frequency area.

27. The apparatus as claimed in claim 24, wherein if pixels of the first and the motion-compensated first images corresponding to pixels of the filtered first image have the same direction, the motion compensation error determination part determines a presence of the motion compensation error by the following equation:

$$|\Delta_{NS}-\text{offset}| \triangleleft \Delta_{NM}| \triangleleft \Delta_{NS}|+\text{offset},$$

wherein offset denotes a predetermined offset value, $\Delta_{NM}$ denotes a difference between corresponding pixel values of the first and the motion-compensated first image, and $\Delta_{NS}$ denotes a difference between corresponding pixel values of the first and the filtered first image.

28. The apparatus as claimed in claim 24, wherein if pixels of the first and the motion-compensated first images corresponding to pixels of the filtered first image have different directions, the motion compensation error determination part determines a presence of the motion compensation error by the following equation:

$$|\Delta_{NS}|-\text{offset} \triangleleft \Delta_{NM}| \triangleleft \Delta_{NS}|,$$

wherein offset denotes a predetermined offset value, $\Delta_{NM}$ denotes a difference between corresponding pixel values of the first and the motion-compensated first image, and $\Delta_{NS}$ denotes a difference between corresponding pixel values of the first and the filtered first image.

* * * * *